J. M. SEYMOUR.
Process of Baling Hay, Cotton, &c.
No. 166,640. Patented Aug. 10, 1875.
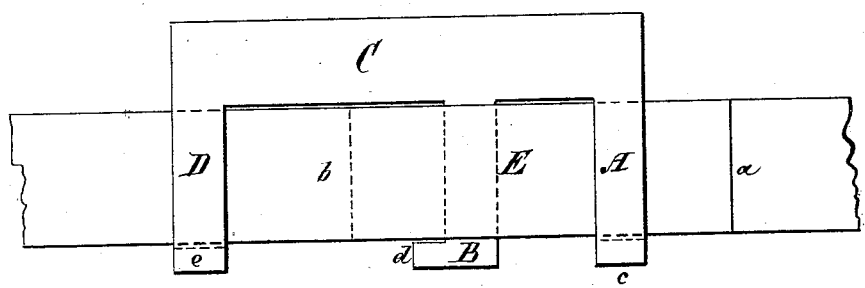
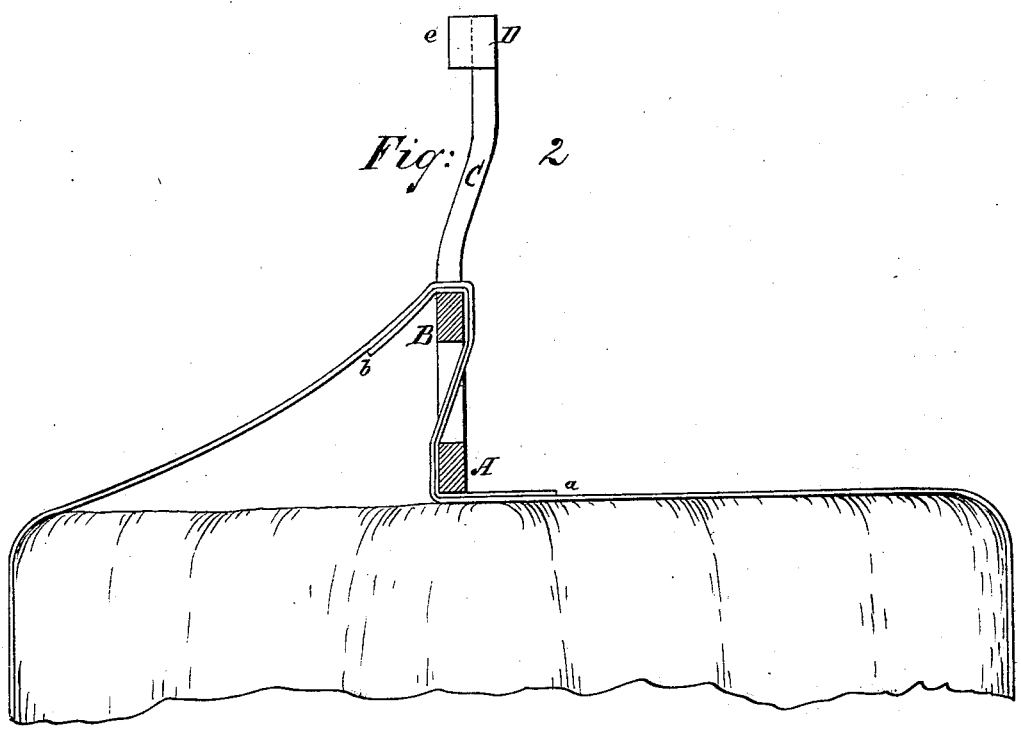
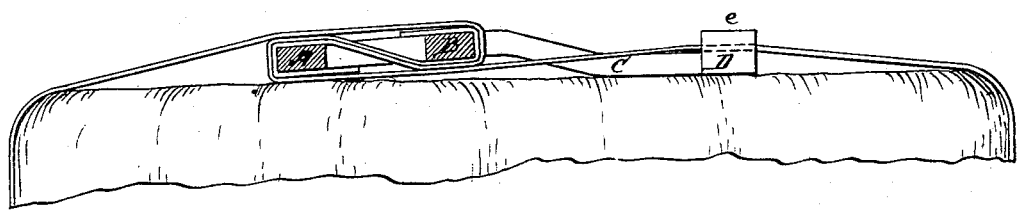
Witnesses: Inventor:

UNITED STATES PATENT OFFICE.

JAMES M. SEYMOUR, OF NEWARK, NEW JERSEY.

IMPROVEMENT IN PROCESSES OF BALING HAY, COTTON, &c.

Specification forming part of Letters Patent No. 166,640, dated August 10, 1875; application filed June 15, 1875.

CASE 1.

*To all whom it may concern:*

Be it known that I, JAMES M. SEYMOUR, of the city of Newark, county of Essex and State of New Jersey, have invented a new and useful Improvement in the Art of Baling Cotton, Hay, and other Materials, of which the following is a specification:

This invention relates to the art or process of applying flexible bands or hoops to cotton, hay, and other materials, whether such materials are elastic or non-elastic, whether baled under pressure or otherwise.

The invention consists in lapping the ends of the band, after it has been passed around the bale, over upon each other, and then, by means of any suitable instrument or device, drawing the band around the bale, and doubling the slack thus taken up in a fold over upon the body of the band, and afterward securing the fold thus made in any efficient manner.

This process is especially valuable in baling cotton, hay, and other elastic materials where, for economy in storage and transportation, it is of great importance to reduce and confine the bale in the smallest possible compass.

In baling these materials by the modes generally in practice, the bands, by reason of the rigidity of the metal of which they are made, are applied loosely around the bale when it is under pressure, and the slack is taken up by the expansion of the compressed material when the pressure is removed. It follows that the bulk of the bale is considerably increased by the expansion which is permitted by the looseness of the bands. This increased bulk of an ordinary bale of cotton weighing five hundred pounds would be not far from four cubic feet, and is a serious inconvenience in storage and transportation.

It is the object of this invention to provide an efficient method of overcoming, at least in part, this difficulty, by perfectly taking up and securing the slack of the confining-bands while the bale is under its greatest pressure.

In carrying the invention into practice any suitable instrument or device may be used to draw the band around the bale and fold the slack over upon the body of the band. The ends of the band and the slack, after it has been taken up into the fold, may be secured by the same device by means of which the slack is taken up; or, after the slack has been taken up by any suitable device, such device may be withdrawn, and any efficient supplemental fastening used. A clamp, clasp, or sleeve may be applied to the fold to retain it in position.

The accompanying drawing illustrates a convenient device for carrying this process into practice, it being by its construction adapted both for taking up the slack and securely fastening it and the ends of the band.

Figure 1 is a plan view of the device and the lap of the band, the bars of the device being shown as properly interlocked with the lap of the band. Fig. 2 is a sectional view of the device and the band when the device has been turned to a position perpendicular to the surface of the bale, and the band is being tightened around the bale. Fig. 3 is a sectional view of the same when the device has been turned completely over and brought down upon the surface of the bale, and the fastening made.

In the drawing, like letters refer to like parts in all the figures in which they appear.

A and B are the straining-bars. C is the lever-arm, by which the device may be turned over endwise and the slack folded over. D is the fastening-bar. E is the lap of the ends of the band. *a* and *b* are the ends of the band. *c*, *d*, and *e* are slight projections on the ends of the bars to prevent the band from slipping off.

The device may be made from metal, and by any of the ordinary ways, and may be of such size and strength as in practice shall be found necessary.

The straining-bars A and B may be placed at a greater or less distance apart, according to the amount of slack to be taken up, inasmuch as the device will take up an amount of slack equal to twice the distance of the straining-bars from each other.

The invention is carried into practice, by the use of the above-described device, in the following manner, viz: After the band has been passed around the bale, and the ends lapped over upon each other, the device and the lap of the band should be interlocked, as shown in Fig. 1 of the drawing, the bar A resting upon the outside of the lap, the bar B lying underneath the same, and the bar D on the same side as the bar A. The device is then turned over endwise toward the bar A, the bar A acting as a center during the first part of the turn. The turn can be made by grasping the lever-arm C with the hand, or with a supplemental lever or other suitable instrument. By referring to Fig. 2 of the drawing the position of the device and the band can be seen when the turn has been one-half completed. The ends of the band are folded over the straining-bars, and the overlying band prevents them from slipping or rendering while the slack is being taken up. As the device is still further turned from the perpendicular position shown in Fig. 2, the straining-bar A will naturally recede along the surface of the bale, and take nearly the position occupied by the bar B when the operation commenced. The effect of this exchange of the positions of the bars A and B is to strain the band at the same moment equally from both sides of the device. When the lever-arm has been forced down upon the surface of the bale—i. e., when the device has been turned completely over—the slack of the band which has been taken up by the operation will be disposed of in a double fold extending from the outside edges of the two straining-bars.

This device may be secured in its final position by swinging the lever-arm laterally from the band as the lever-arm is being brought down from the perpendicular position toward the surface of the bale till the fastening-bar is outside the line of the band, when the fastening-bar is forced underneath the band, and thus retained in place. This position can be seen by referring to Fig. 3 of the drawing.

This device, with some modifications, constitutes the subject-matter of another application of even date herewith, under the title of "Improvement in Buckles for Cotton-Bales and other Packages," in which the same is fully described and claimed.

It should be understood that the device above described is only one of many which may be used to assist in carrying the invention into practice. Any instrument which is adapted to take hold of the band and, by folding one portion thereof over onto the body of the band, take up the slack, may be employed for this purpose, and then the slack and the ends of the band may be retained by any fastening which will be efficient to retain them in place.

A process analogous to the one herein described may be used to tighten bands and hoops which have been applied to bales or packages and fastened by any of the usual ways, and which have become loosened by repeated handling or otherwise. In such cases the fastening which holds the ends of the band can remain, and the slack be taken up and folded upon any portion of the body of the band which embraces the bale.

It is not designed to limit this invention to the use of bands or hoops of any particular form or manufacture, nor to the baling of any particular material; but it is intended that its use, without regard to the kind of bands or the material to be baled, shall be as general as the ends it is adapted to accomplish.

What is claimed as new is—

The process heretofore described of applying flexible bands to materials to be baled, and which consists in lapping the ends of the band, after it has been passed around the bale, over upon each other, and then, by any suitable device. taking up the slack of the band by folding a part of the band over upon a contiguous part thereof, and afterward securing the fold thus formed in any efficient manner.

JAS. M. SEYMOUR.

Witnesses:
THOS. P. HOW,
ROBT. H. DUNCAN.